(12) United States Patent
Rempe et al.

(10) Patent No.: US 9,076,169 B2
(45) Date of Patent: Jul. 7, 2015

(54) DIGITAL DELIVERY SYSTEM AND METHOD

(75) Inventors: Nathan D. Rempe, Lincoln, NE (US); Barry S. Major, Omaha, NE (US)

(73) Assignee: Nebraska Book Company, Inc., Lincoln, NE (US)

( * ) Notice: Subject to any disclaimer, the term of this patent is extended or adjusted under 35 U.S.C. 154(b) by 1590 days.

(21) Appl. No.: 11/840,603

(22) Filed: Aug. 17, 2007

(65) Prior Publication Data
US 2008/0046374 A1 Feb. 21, 2008

Related U.S. Application Data

(60) Provisional application No. 60/838,709, filed on Aug. 18, 2006.

(51) Int. Cl.
*G06Q 30/00* (2012.01)
*G06Q 30/06* (2012.01)

(52) U.S. Cl.
CPC ........................ *G06Q 30/06* (2013.01)

(58) Field of Classification Search
CPC ....................................... G06F 21/10
USPC .......................................... 705/59
See application file for complete search history.

(56) References Cited

U.S. PATENT DOCUMENTS

| | | | | |
|---|---|---|---|---|
| 5,151,684 A * | 9/1992 | Johnsen | ............ | 340/568.1 |
| 5,493,107 A * | 2/1996 | Gupta et al. | ............ | 235/383 |
| 5,696,908 A | 12/1997 | Muehlberger et al. | | |
| 5,971,277 A * | 10/1999 | Cragun et al. | ............ | 235/462.01 |
| 5,986,690 A * | 11/1999 | Hendricks | ............ | 725/60 |
| 6,034,680 A * | 3/2000 | Kessenich et al. | ............ | 715/733 |
| 6,050,493 A | 4/2000 | Fertig | | |
| 6,386,591 B1 * | 5/2002 | Blank | ............ | 283/75 |
| 6,389,541 B1 | 5/2002 | Patterson | | |
| 6,404,869 B1 | 6/2002 | Henderson et al. | | |
| 6,901,385 B2 | 5/2005 | Okamoto et al. | | |
| 7,191,939 B2 | 3/2007 | Beck et al. | | |
| 7,542,625 B2 * | 6/2009 | Manber et al. | ............ | 382/305 |
| 2001/0054010 A1 * | 12/2001 | Bernabeo et al. | ............ | 705/26 |
| 2002/0052798 A1 | 5/2002 | Nishikado et al. | | |
| 2002/0082939 A1 * | 6/2002 | Clark et al. | ............ | 705/26 |
| 2003/0078934 A1 * | 4/2003 | Cappellucci et al. | ............ | 707/101 |
| 2003/0200179 A1 | 10/2003 | Kwan | | |
| 2004/0002904 A1 * | 1/2004 | Deas et al. | ............ | 705/27 |
| 2004/0093279 A1 | 5/2004 | Yamanoue et al. | | |
| 2005/0061873 A1 * | 3/2005 | Pirillo | ............ | 235/380 |
| 2005/0099292 A1 * | 5/2005 | Sajkowsky | ............ | 340/539.13 |
| 2005/0246193 A1 * | 11/2005 | Roever et al. | ............ | 705/1 |
| 2006/0002607 A1 * | 1/2006 | Boncyk et al. | ............ | 382/165 |
| 2006/0036539 A1 * | 2/2006 | Tombroff | ............ | 705/39 |
| 2006/0116891 A1 | 6/2006 | Muller et al. | | |
| 2006/0117158 A1 | 6/2006 | Shionoya et al. | | |
| 2006/0235855 A1 * | 10/2006 | Rousseau et al. | ............ | 707/100 |
| 2006/0253399 A1 | 11/2006 | Chatani | | |
| 2006/0271489 A1 * | 11/2006 | Flanagan et al. | ............ | 705/52 |

OTHER PUBLICATIONS

Lawinski, J. (2005). Reseller Reinvents Inventory Control. CRN, (1165), 35. Retrieved from http://search.proquest.com/docview/227595224?accountid=14753.*

* cited by examiner

*Primary Examiner* — Jason Dunham
*Assistant Examiner* — Alexis Casey
(74) *Attorney, Agent, or Firm* — Westman, Champlin & Koehler, P.A.

(57) ABSTRACT

A digital delivery system and method. The method includes receiving identification information related to at least one digital book, and generating an anonymous receipt that has a single access code that represents the at least one digital book.

13 Claims, 14 Drawing Sheets

FIG. 4D

| Home | Web Based POS | Search | Reports | Store | Admin |   Logged in as: Administrator (Log Off)

Edit Store Information

Add a Digitalbook to the Database:

- *Store Name:
- Contact First Name:
- Contact Last Name:
- Contact Phone Number: ___ ext ___
- Contact Email:
- Address Line 1:
- Address Line 2:
- City:
- State:
- Zip Code: ___ - ___
- Phone Number: ___ ext ___
- Affiliated Institution:
- Store Logo: [Logo] Select New Image [___] [Browse]
- Store Logo On Page: [Yes ▼]
- Hangtag Logo: [Logo] Select New Image [___] [Browse]
- Show Logo On Hangtag: [Yes ▼]
- *Default Margin: [30] %
- *Rounding Option: [Up ▼]
- *Rounding Amount: [Quarter ▼]
- *Allow Sales?: [Yes ▼]

[Submit] [Reset]

Having difficulties? Contact DDS support at support@DDS.com.

| Home | Web Based POS | Search | Reports | Store | Admin |   Logged in as: Administrator (Log Off) |

Search For Available Digitalbooks:

Publisher: [All ▼]
Provider: [All ▼]

ISBN: [                    ]
(one ISBN per line)

Title: [                    ]
Author: [                    ]
Status: [Active ▼]    238

[Submit] [Reset]

Add a new Digitalbook
Having difficulties? Contact DDS support at support@DDS.com.

| Home | Web Based POS | Search | Reports | Store | Admin | Logged in as: Administrator (Log Off) |

Add Digitalbook

Add a Digitalbook to the Database:

*Title:
*Author:
Edition:                 ⟵ 440
Copyright:               ⟵ 442
*Digital ISBN:
*Printed ISBN:
*Publisher:       [▼]
*Provider:        [▼] ⟵ 444
*Format:
*Platform:
*Highlighting:    Yes [▼]
*Searching:       Yes [▼]
*Comments:        Yes [▼]
*Reading Out Loud: Yes [▼]
*Copying to Clipboard: Yes [▼]
*Sharing:         Yes [▼]
*Printing:
*Expiration:
*Location:
*NBC Cost:
*Print Price:
*Provider Product Code:
*Status:          Active [▼]

[Submit]  [Reset]

Having difficulties? Contact DDS support at support@DDS.com.

FIG. 4H

DIGITAL DELIVERY SYSTEM AND METHOD

CROSS-REFERENCE TO RELATED APPLICATION

The present application is based on and claims the benefit of U.S. provisional patent application Ser. No. 60/838,709, filed Aug. 18, 2006, the content of which is hereby incorporated by reference in its entirety.

BACKGROUND

As more and more books are published in traditional and in electronic book formats, booksellers are in danger of becoming extinct if they do not learn how to provide digital content to consumers. However, dealing with digital content typically adds layers of complexity for booksellers. In general, selling of digital content can be complex and difficult to integrate with conventional sales systems.

SUMMARY

A digital delivery system (DDS) and method that addresses at least some of the above-mentioned problems is provided. The method includes receiving identification information related to at least one digital content item (for example, a digital book), and generating an anonymous receipt that has a single access code that represents the at least one digital content item. A digital delivery system that is capable of carrying out this method is also provided.

This summary is not intended to describe each disclosed embodiment or every implementation of the digital delivery system. Many other novel advantages, features, and relationships will become apparent as this description proceeds. The figures and the description that follow more particularly exemplify illustrative embodiments.

BRIEF DESCRIPTION OF THE DRAWINGS

FIGS. 3A-3D and 4A-4H are diagrammatic illustrations of example screens included in the DDS.

While the above-identified figures set forth one or more embodiments of the digital delivery system, other embodiments are also contemplated, as noted in the disclosure. In all cases, this disclosure presents the digital delivery system by way of representation and not limitation. It should be understood that numerous other modifications and embodiments can be devised by those skilled in the art which fall within the scope and spirit of the principles of this disclosure.

DETAILED DESCRIPTION OF ILLUSTRATIVE EMBODIMENTS

Disclosed here is a digital delivery system (DDS) that allows customers (bookstores, for example), of the owner (entity that administrates the distribution of digital content) of the DDS, to sell, deliver, and manage digital content to consumers (students, for example).

The DDS provides mechanisms which allow for both online (Internet) and in-store sale of digital content. It is noted that while sales may occur online and in-store, the delivery and management is done through a centralized online system.

It is assumed that the content sold through the system includes licensed material which must have some form of copy and usage controls. The content is sold with a digital rights management (DRM) wrapper that controls access to and use of the content.

The DDS does not have internal DRM controls and is not meant to be a digital rights management product for consumers. Instead, it provides a gateway or portal to content providers who deliver the DRM wrapped content.

The system controls access to and tracking of digital content. It does not, however, intrinsically provide controls over the use of the content or payment for the content.

Figure 1:
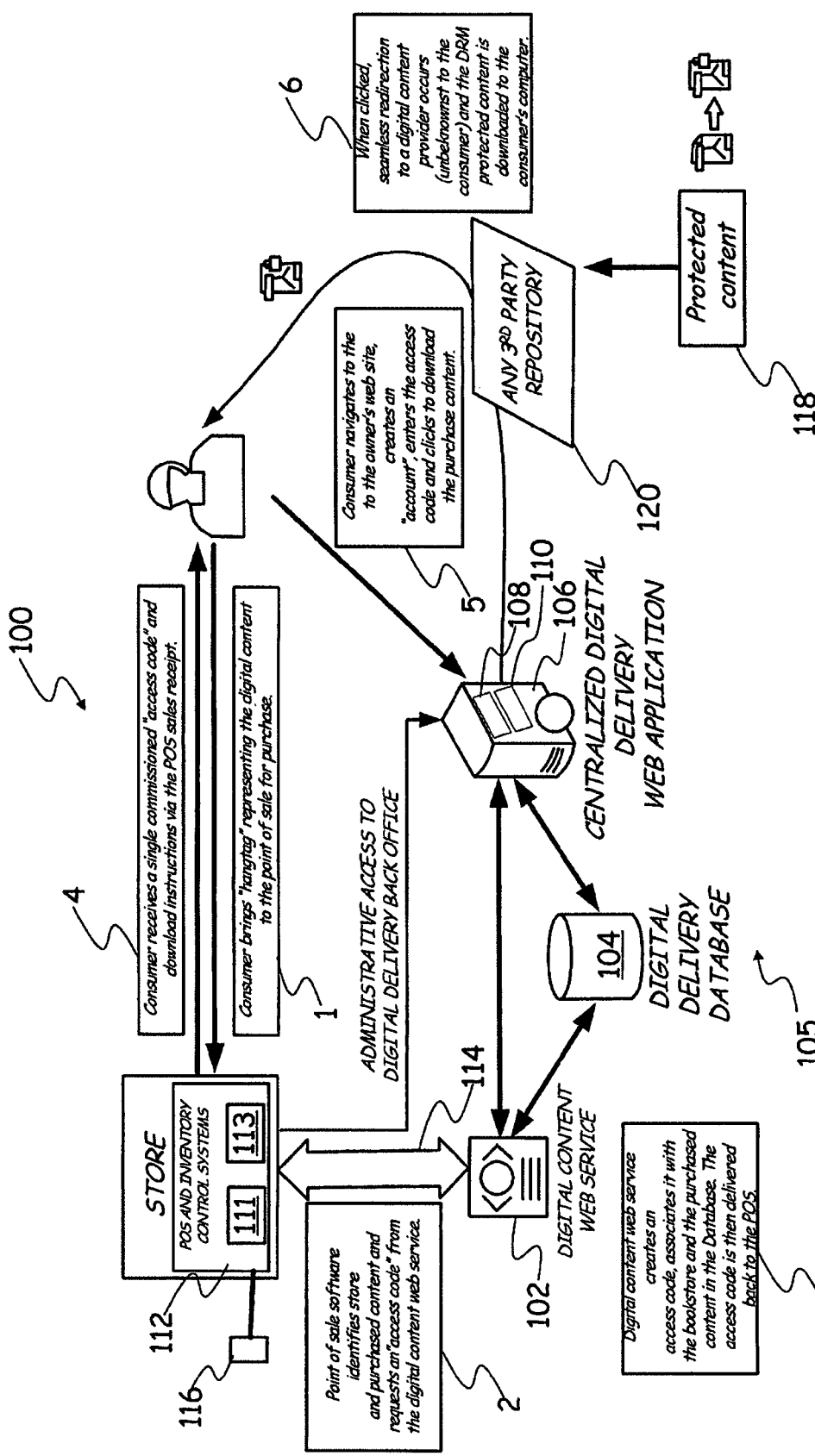
FIG. 1 illustrates an embodiment of an architecture and process of use and operation of the DDS.

FIG. 1 is a simplified block diagram that illustrates an architecture and process of use and operation of one embodiment of the DDS. As can be seen in FIG. 1, primary components of DDS 100 are a digital content web service component 102, a digital delivery database 104, a centralized digital delivery web application 106 (which includes a back office site 108 and a digital delivery site 110) and an integrated in-store point-of-sale (POS) and inventory control systems 112. It should be noted that while POS system 112 is shown as being a part of DDS 100 in FIG. 1, it is also configured to carry out "physical-item" sales independently of the remaining components (102, 104, 106, 108 and 110) of DDS 100. Thus, POS system 112, which includes an input 111 and a processor 113, is a dual functionality component that is capable of carrying out both physical item sales and digital content item sales when digital-content-sales-interface 114 is enabled. When interface 114 is disabled, POS system 112 can still be used for physical item sales. Thus, components 102, 104, 106, 108 and 110, when connected together, constitute a digital content handling system 105, which together with interface 114 and POS 112 constitute the DDS 100. The process of use and operation of DDS 100 is first briefly described below. Some of its novel features are then listed, and details regarding the different components of the DDS are provided further below.

As can be seen in FIG. 1, at step 1, a consumer (student, for example) brings a "hangtag" which represents the digital content, to the POS for purchase. The term "hangtag," as used herein means a sheet bearing user-readable and machine-readable indicia. The hangtag may be printed or generated on demand by a user. In one embodiment, the hangtag is a tag that hangs next to the printed textbook in a bookstore. The hangtag representing the digital content item has no intrinsic value in itself. It only represents the "opportunity to buy"—the tool by which to identify and purchase the digital content. This eliminates the possibility of theft and allows for the reuse of the hangtag. In general, a hangtag, which is described in detail further below, includes both printed and bar-coded identification information for a digital content item (digital book, for example). Thus, when the consumer brings the hangtag to the POS for purchase of the respective digital content item, identification information for the digital content item form the hangtag can be read and manually entered, or the bar-coded identification information simply scanned (using barcode scanner 116), by a cashier into the POS system. It should be noted that multiple digital content items (for example, different digital books, each represented by a different hangtag) can be purchased in a single transaction. At step 2, point of sale software identifies the customer (bookstore, for example) and purchased digital content items and requests, via interface 114, an "access code" from digital content web service 102. At step 3, web service 102 creates an access code and associates it with the customer (the bookstore, for example) and the purchased content in the database 104. The access code is then delivered, via interface 114, to POS system 112. At step 4, the consumer receives a single commissioned "access code" and download instructions via a POS sales receipt. At step 5, the consumer navigates to the DDS owner's web site, creates an "account," enters the access code and clicks (or touches with a finger, pen or stylus, or uses any other suitable means depending on the type of display device and user interface) to download the purchased content. Specific screens that can be used by the consumer to carry out step 5 are described further below. Step 6 indicates that, when clicked (or touched or selected by any suitable means), seamless redirection to a digital content provider (or providers, when multiple digital content is purchased from multiple digital book platforms) occurs (unbeknownst to the consumer) and the DRM protected content is download to the consumer's computer. In some embodiments, protected digital content items (denoted by reference numeral 118) available for download upon purchase are created and stored in a third-party repository, which is denoted by reference numeral 120 in FIG. 1. The above-described "digital" buying process does not veer far from the "physical" buying process. This is because, as in the case of a physical buying process, which involves the generation of a receipt, in the above-described digital buying process, the delivery of an access code is on the receipt, and only on the receipt. It is noted that, in the DDS, a web-based POS system is substituted in the event a store cannot support an in-store POS.

The POS system has a configuration screen which allows the administrator to configure options related to digital book sales. The screen provides options for entering the following:

Binding Code—Which binding code is used on this POS system to identify E-Book's. (Normally, a binding code is used to identify hardback, paperback, spiral bound, etc. The POS system looks for this special binding code to determine whether to provide additional processing to digital content as it is sold.)

Novel features of the DDS include:
1) Using a single access code across multiple digital content platforms.
2) Tying the access code to a receipt such that a unique duo that represents one or more than one digital content platform is produced.
3) Linking a POS system with a digital content handling system that uses one or more of the following:
   a single access code
   delivery of all information on the sales receipt
   a reusable hangtag that represents a digital content item.
4) Utilizing a receipt that represents a value plus a history of transactions. The receipt is anonymous (not tied to a user) and content is moved from the receipt to a digital bookshelf (user-specific domain) which is non-anonymous.

These and other novel features will be more apparent in the more detailed description of the components of DDS 100 provided below.

DDS 100 is driven by digital content web service 102, which is a central web service hosted on an Internet site. This service provides substantially all the functionality that is used by customers (bookstores, for example) to sell, deliver, and manage the digital content. The web service 102 is accessed by the customer's internal (point-of-sale) systems and by one or more web front ends. Each web service request includes an authentication wrapper that requires an account ID and password. In some embodiments, web service calls communicate exclusively via a 128-bit secure socket layer (SSL).

Back office site 108 acts as a shell, accessing portions of the digital content web service 102. Back office site 108 allows owners/administrators and customers (bookstores, for example) which use the DDS to access management portions of the digital content web service 102. Owners/administrators may use the site 108 to configure content, add and manage consumer accounts, generate reports, etc. Customers (stores) may use site 108 to sell digital content access codes, view customer accounts activity, order or print hangtags, record sales or refunds, get availability/pricing information on new and existing titles, and view/print transactional reports. Individual functions provided by the back office site 108 are described in detail further below.

Digital delivery site 110 of FIG. 1 is an Internet accessible web site that also acts as a shell, accessing portions of the digital content web service 102. Digital delivery site 110, however, is targeted toward consumers that want to access digital content which they have previously purchased either in a store or online. The consumer has a receipt number and access code, which is used to control access to site 110. In some embodiments, digital delivery site 110 can be designed around a specific brand and name to be provided. In certain embodiments, there are hooks built in so that the site may be branded by different customers using the service. Individual functions provided by the digital delivery site 110 are described in detail further below.

Point of sale integration involves modifying point of sale systems such that as digital content is purchased (or refunded) in the store, access to that content is made available (or removed) from the digital delivery system. POS receipts direct the consumer to the (potentially bookstore specific) Internet uniform resource locator (URL) of the digital delivery site 110.

Any suitable platform can be used to host the DDS. In one embodiment, the digital delivery web service 102 is a NET based web service hosted on an Internet site. As indicated above, service 102 provides secure access to web methods which provide the functionality used by management sites, delivery sites, and for point of sale integration. In some embodiments, the web service 102 is developed with the intent that there may be multiple management and/or delivery sites. The digital delivery web service 102 simply makes all features available; it is not tied to any specific presentation. As indicated above, web service 102 is also responsible for dictating authentication and access provisioning. In some embodiments, application level security is used, where usernames/passwords are passed in as parameters to various web methods. Each web service request requires an authentication wrapper node that takes an account ID and password. In one embodiment, to ensure these items are secure in transmission, the service is only accessible via SSL.

In some embodiments, the web service 102 is written so that it supports a stateless and sessionless presentation layer. This serves to simplify the design of the web sites that make use of the service, and it also allows for load balancing the site across multiple machines in a server farm.

As noted earlier, the back office site 108 is a management site that is Internet accessible and gives administrative access to functions provided by digital delivery web service 102. As indicated earlier, it is used by employees of the owner of the system and customers subscribing to the DDS.

In some embodiments, back office site 108 has a basic menu navigation form, each menu option corresponding to a method made available to the digital delivery web service 102. Each of these menu options is associated with a "role." Once authenticated, the user only sees those menu options associated with that user's role. Example roles includes "administrator," used by the owner of the DDS, and "store," used by customers.

In one embodiment, back office site 108 uses extensible stylesheet language transformations (XSLT) styled with cascading style sheets (CSS) to render each page. In such an embodiment, site 108 is an active server pages (ASP).NET based site that requests extensible markup language (XML) data/content from digital content web service 102. The site then performs an XML to hypertext markup language (HTML) transformation using an extensible stylesheet language (XSL) stylesheet. Embedded CSS class references in the XSL stylesheet allows designers to customize the look and feel of site 108 without the assistance of a developer.

As noted above, a number of customer functions (or store functions) are available in back office site 108. These functions include several web-based POS functions. The POS functions include a sale screen, which provides for manual sale as if done from POS. To perform a manual sale via the back office web site 108, the customer (bookstore, for example) adds each selected title to a "cart" and requests the generation of a single access code. This access code is presented in printable "receipt" form via a web interface which the store can print and provide to the consumer. The store is responsible for ringing up the transaction and collecting payment. The POS functions also include a refund screen, which provides for manual refund as if done from POS. To perform a manual refund via the back office web site 108, the customer navigates to a refund section of the application, enters the access code, corresponding receipt number, optional comments field, and selects to remove the specific title. Customers (stores) also have the option to refund the entire transaction with a single click (or touch or other suitable selection technique). All refunds are recorded, however, once an access code is removed, it cannot be restored. The customer is responsible for all monetary reimbursement to the consumer. Customers are not charged for refunded content.

Figure 2:
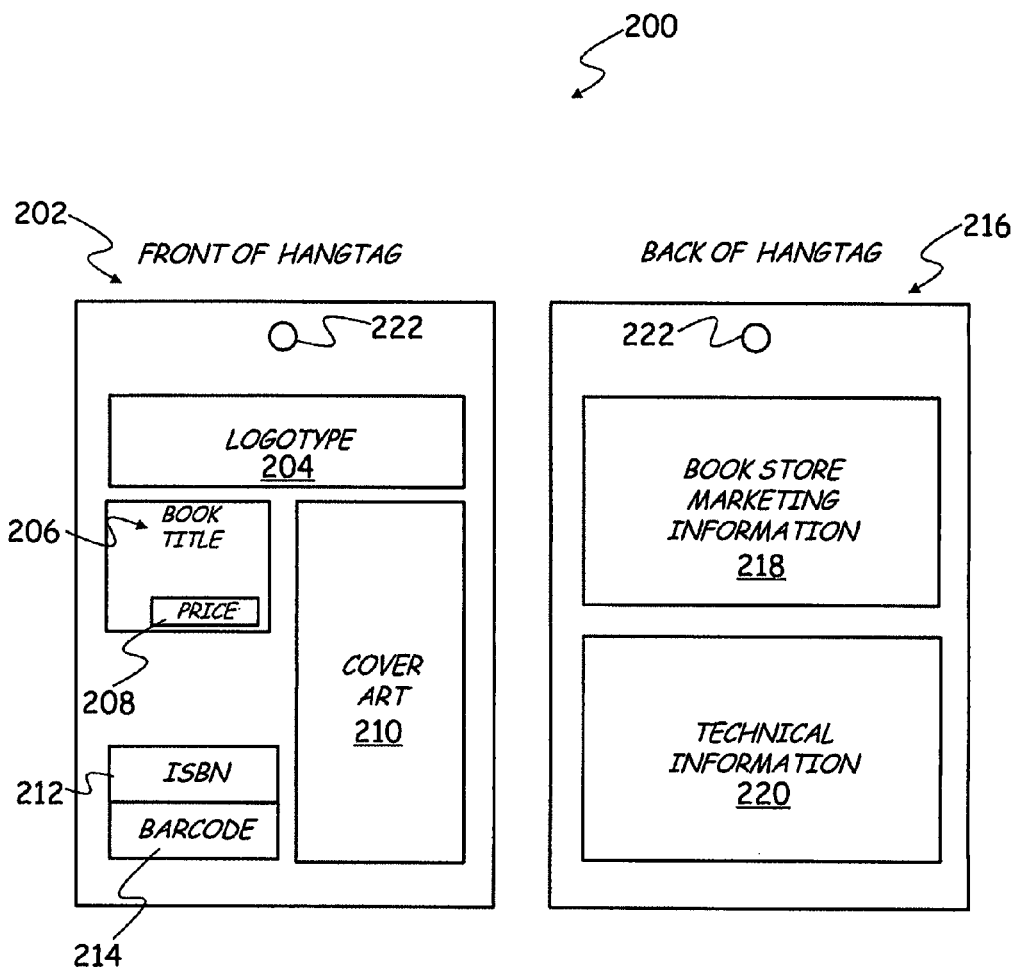
FIG. 2 is a simplified block diagram that illustrates front and back portions of a hangtag used by the DDS.

Several search screens that are available to "administrator" and "store" roles, for example, are also provided. Administration screens to add and disable login information, etc., are also included. Further, several different types of reports can be generated and printed from back office site 108. Printing of hangtags is also carried out from back office site 108. In one example embodiment, which is designed primarily for the sale of digital books, certain display screens are configured to include a print button (or other suitable print activation feature) next to each displayed digital book title. Clicking on (or selecting by another suitable means) a particular print button will result in a hangtag being printed for the corresponding digital book title. FIG. 2 illustrates front and back portions of an exemplary hangtag 200. As can be seen in FIG. 2, front portion 202 of hangtag 200 may include a logotype 204, a digital book title 206, a digital book price 208, cover art 210, which may be included on a printed version of the digital book, international standard book number (ISBN) 212 and bar-coded information 214, which can include a bar-coded ISBN number. Back portion 216 of hangtag 200 may include information such as bookstore marketing information 218 and other technical information 220 about the particular digital book that the hangtag represents. Groove or hole 222 is used for hanging tag 200.

As noted earlier, the digital delivery site 110 is an Internet accessible web site geared toward consumers that have purchased content from another web site or from within a store. It is the default web site that consumers use to gain access to their digital content.

In one embodiment, digital delivery site 110 is developed using CSS, XSL, and XML. In such an embodiment, site 110 is an ASP.NET based site that requests data/content from digital content web service 102. The data/content is returned in an XML document. The XML document is used in conjunction with an XSL template. The XML and XSL is transformed into HTML for delivery to a consumer's browser. The XSL leverages the use of CSS to make the look and feel of site 110 independent of programming logic.

In some embodiments, digital delivery site 110 can be "branded" for use by a particular store. The indication that a store is branded can be included as part of the URL, in some embodiments.

Figure 3A:
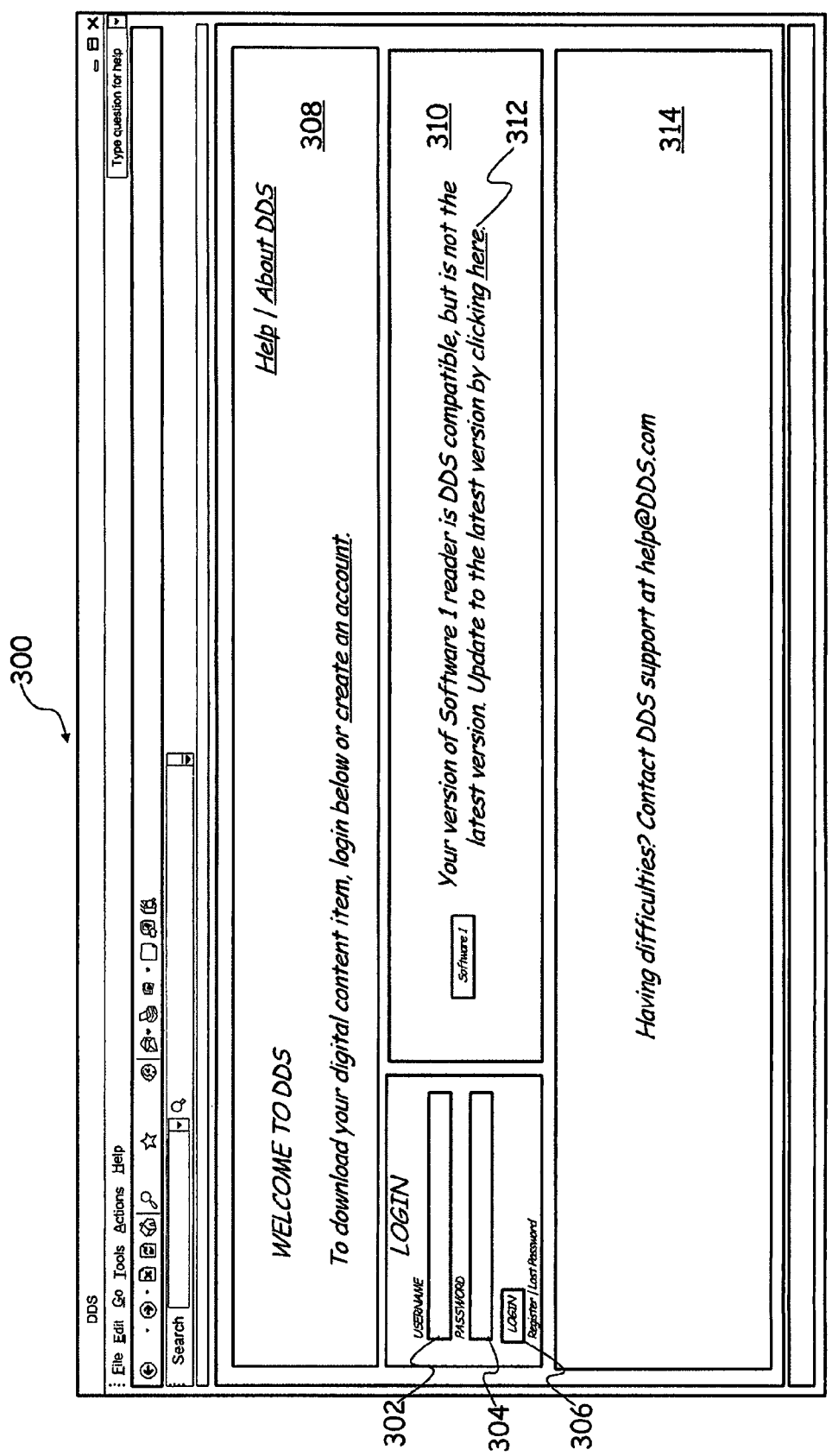

FIGS. 3A through 3D show example screens, which are a part of digital delivery site 110. Screen 300, shown in FIG. 3A, primarily serves as a consumer login screen. Accordingly, screen 300 includes a username field 302 and a password field 304. A consumer submits login information to the DDS by pointing and clicking (or using any other suitable selection technique) on login button 306. A list of valid usernames and passwords are stored in database 104 to provide the necessary verification at the time of login. Screen 300 also allows a new customer to create an account. The account creation feature and help features are included in block 308 of screen 300. Block 310 provides a list of third party programs suitable for use with the DDS. In FIG. 3A, only a single program, Software 1 reader, is included in the interest of simplification. Each item in the list of third party programs includes a clickable (in general, selectable) portion (denoted by reference numeral 312 in the example item of FIG. 3A) for easy downloading of the respective software program. Block 314 includes consumer support contact information.

Figure 3B:
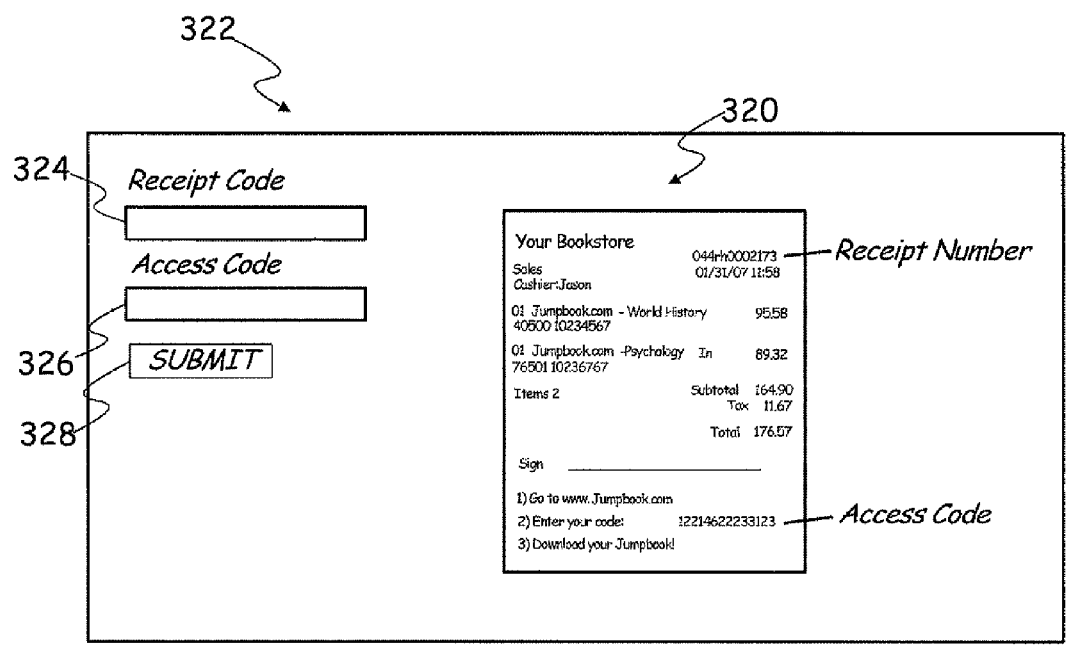
Figure 3C:
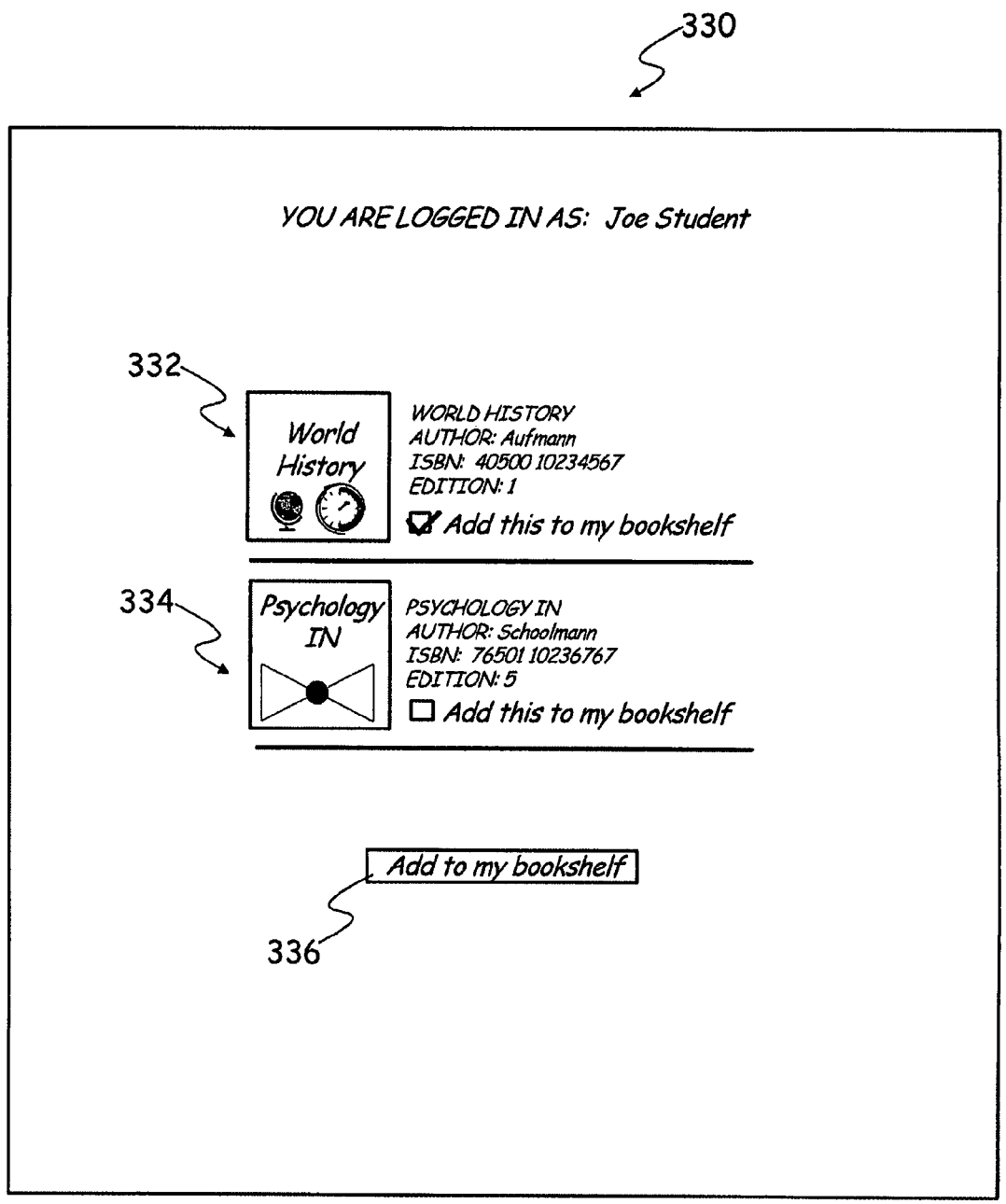
Figure 3D:
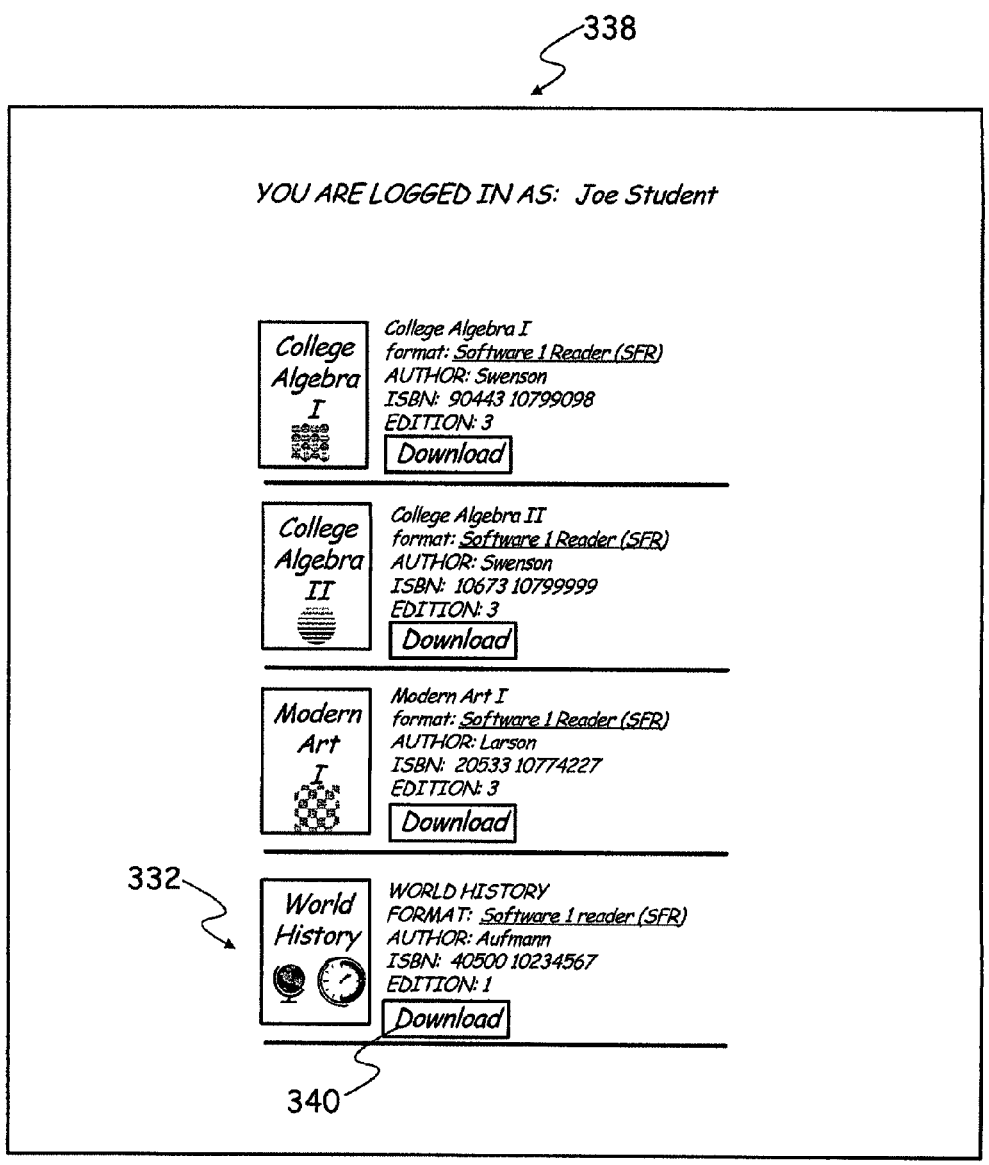

In the interest of simplification, blocks with help features, consumer support features etc., have been excluded from the example block diagrams of screens shown in FIGS. 3B through 3D. Only components used to carry out the primary functions of these screens are shown.

In FIG. 3B, an example receipt 320 is shown along with receipt information entry screen 322. A consumer can access screen 322, and other screens described below, only after successfully logging in to the DDS using screen 300. Primary components of screen 322 include a receipt number field 324 and an access code field 326. A consumer enters a receipt number and an code from receipt 320 into fields 324 and 326, respectively, and submits the entered information using button (in general, selection/activation feature) 328. If this information is properly entered and submitted, screen 330 (FIG. 3C), which displays a list of items on the receipt that are still available for transfer to a consumer's bookshelf (user-specific domain or consumer-specific domain) is automatically displayed. In the example of FIG. 3C, two items (denoted by reference numerals 332 and 334) are available for transfer from receipt 220 to a consumer's bookshelf. In the example of FIG. 3C, the consumer selects item 332 and clicks on add to my bookshelf button 336 (or submits using any other suitable means). This results in bookshelf screen 338 (shown in FIG. 3D) being displayed. In the example of FIG. 3D, item 332 is displayed as the last item in the bookshelf. The consumer can download this and other items in the bookshelf by clicking on (or, in general, activating) the respective download button (or other selection/activation feature) 340 for the item.

Figure 4A:
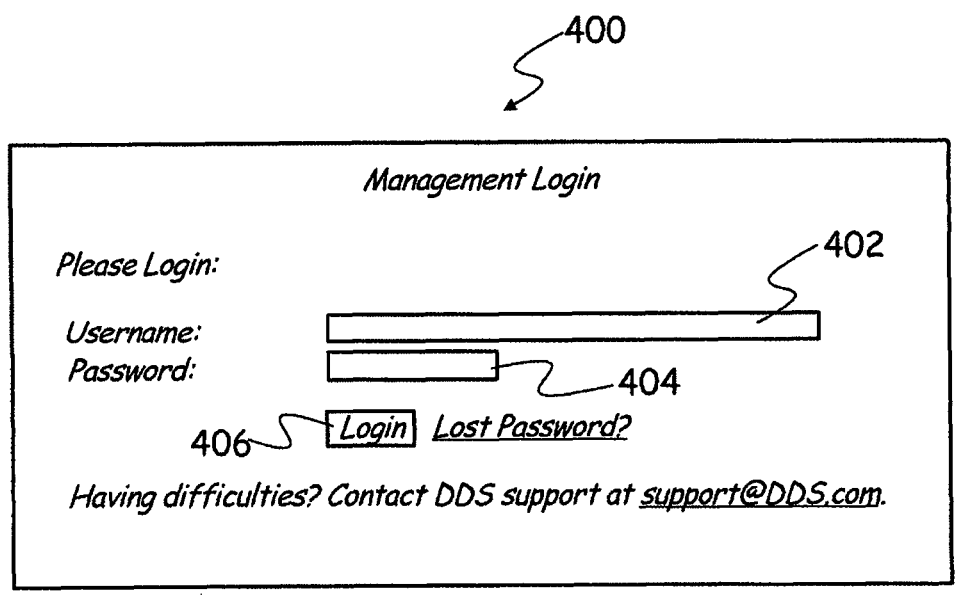
Figure 4B:
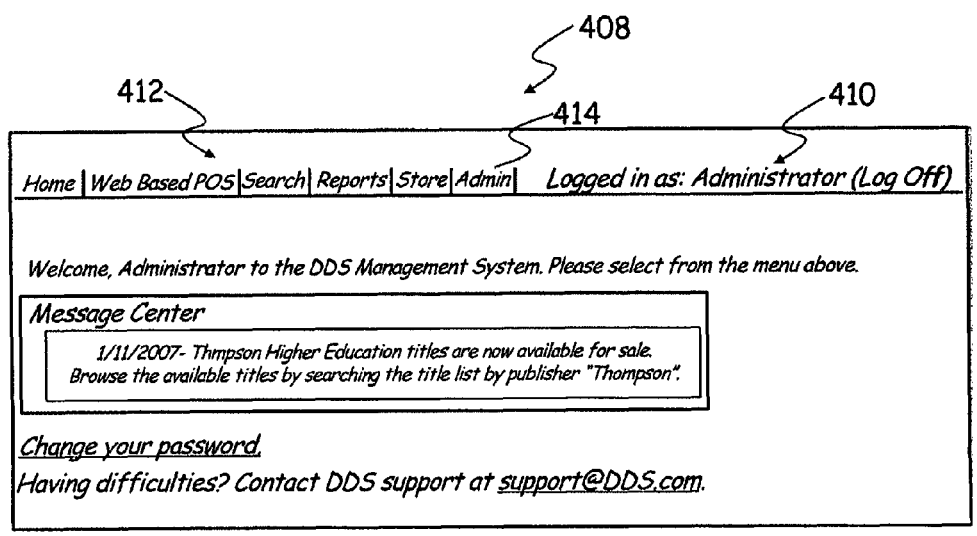
Figure 4C:
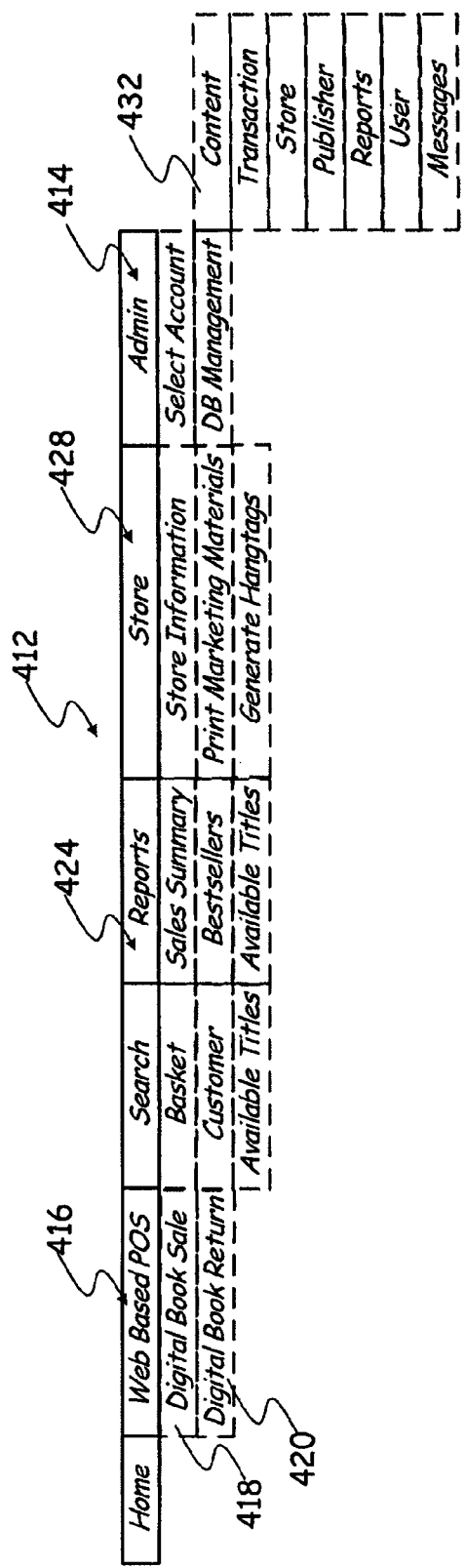

FIGS. 4A through 4H show example screens, which are a part of back office site 108. Screen 400, shown in FIG. 4A, is a management login screen. Screen 400 includes a username field 402 and a password field 404. An administrator of the DDS or a customer (store owner, for example) submits login information to the DDS by pointing and clicking on login button (or selecting a different suitable means) 406. If the login information is correctly entered and submitted, screen 408 (shown in FIG. 4B) is displayed. As noted above, once authenticated, the user only sees those menu options associated with that user's role. As can be seen in FIG. 4B, a top portion of screen 408 indicates that the currently logged in user is an administrator. This is denoted by reference numeral 410. Menu 412 also corresponds to functions available to an administrator. Accordingly, if the currently logged used were a store owner, admin menu option 414 would not appear on screen 408. Menu 412 is a drop down menu that can have example menu options such as those shown in FIG. 4C. Certain example screens that can be accessed from options of menu 412 are shown in FIG. 4D through 4H.

Figure 4D:
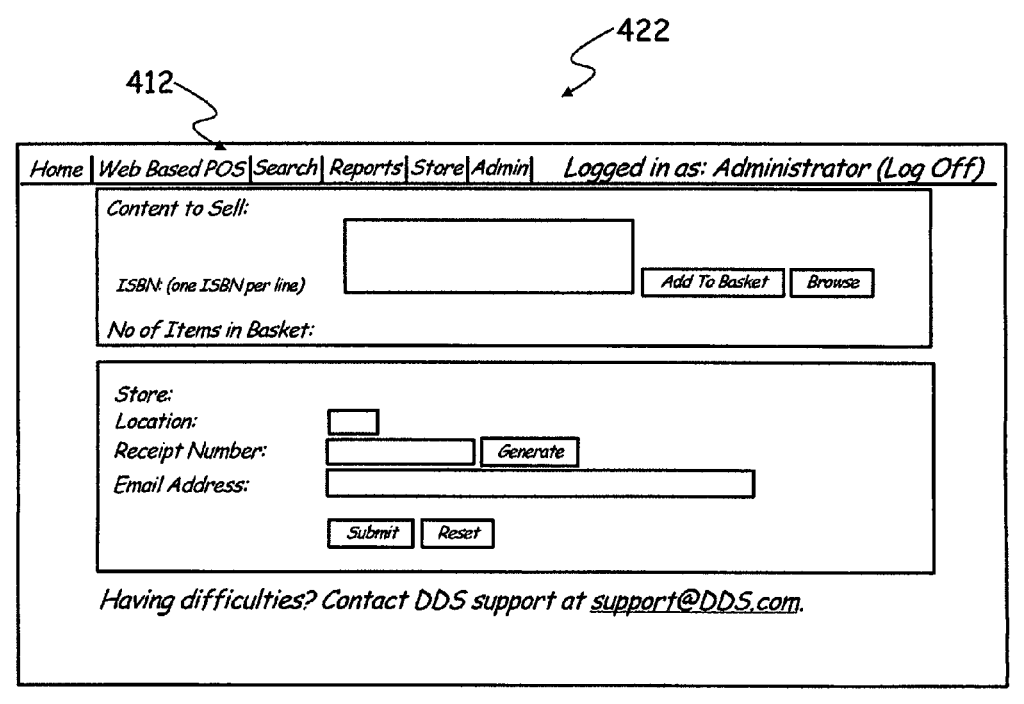

As noted earlier, a web based POS system is substituted in the event a store cannot support an in-store POS. In menu 412, web based POS functions are available under menu option 416. In the example shown in FIG. 4C, menu items available under web based POS option 416 include digital book sale 418 and digital book return 420. FIG. 4D shows an example digital book sale screen 422, which is displayed upon clicking (or, in general, selecting) menu item 422. As can be seen in FIG. 4D, screen 422 has fields for entry and generation of information that allows for the sale of one of more digital books in a manner substantially similar to that described above in connection an in-store POS system.

Figure 4E:
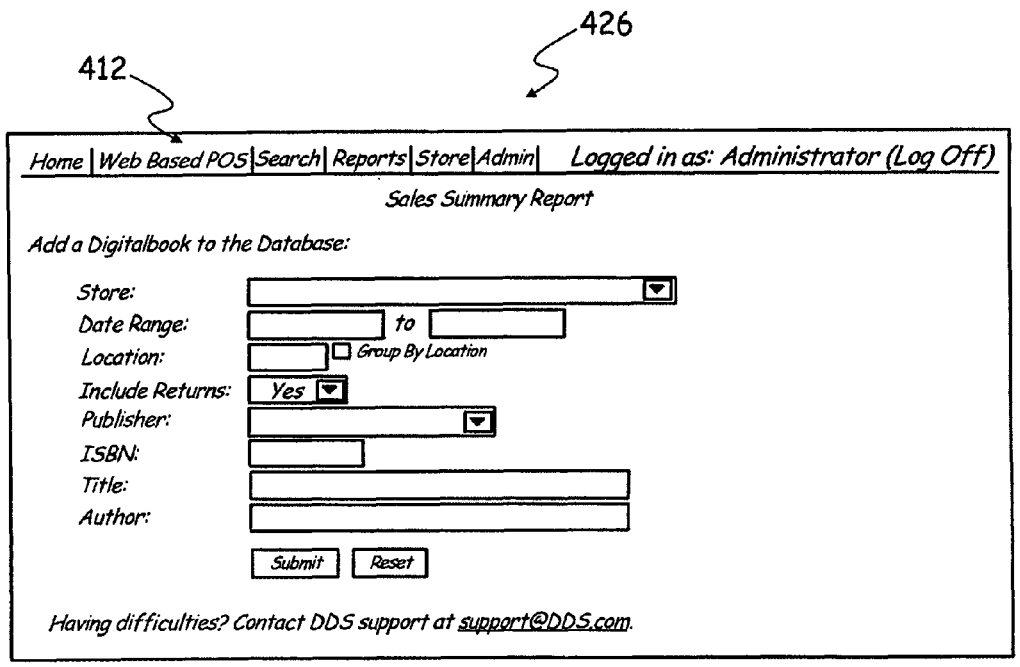

FIG. 4E shows a sales summary report generation screen 426, which is accessed from reports menu option 424. As can be seen in FIG. 4E, several options for information entry are available in screen 426. Therefore, different types of general and specific reports can be obtained from this screen. However, the role of a logged in user may dictate the scope of information accessible using screen 426. FIG. 4F shows a store information update screen 430, which can be accessed from store menu option 428. As can be seen in FIG. 4F, different store related information such as logotypes, contact information and hangtag related information can be updated from this screen.

FIGS. 4G and 4H show screens 434 and 436, respectively, that can only be accessed by an administrator and therefore are under content option 432 of admin menu option 414. Clicking on (or, in general, selecting) menu option 432 results in content search screen 434 being displayed. As can be seen in FIG. 4G, this screen allows a user to search, in the DDS, for available digital books using different search criteria. Also, from screen 434, a user can click on (or, in general, select) section 238 to add a new digital book. Clicking on (or, in general, selecting) section 238 results in screen 436 (FIG. 4H) being displayed. On screen 436, other that edition field 440 and copyright field 442, the remaining fields are required for a digital book to be successfully entered into the DDS. As can be seen in FIG. 4H, provider field 444 includes a drop-down list of providers that digital content items may come from. In general, as indicated above, the DDS is format agnostic and therefore can provide digital books (or digital content items) from different providers that may use different digital platforms.

As noted earlier, digital delivery database 104 stores information generated from the use of the digital delivery system 100. In an example embodiment, which is primarily used for the sale of digital books, entities of digital delivery database 104 can include a provider table, which is utilized to store a list of providers that digital content items may come from, and a publisher table that stores a list of publishers whose items are available for sale. A publisher is associated with a specific provider. If a publisher eventually provides data via multiple providers, then corresponding multiple publisher records are created. Each record is associated with a specific publisher (and hence to that publisher's provider). A content table is utilized to store a list of digital content items for sale. A content table record contains bibliographic information such as author, title, printed ISBN, digital ISBN, edition, copyright, etc. The content table also has an active/inactive flag that controls whether or not a particular digital content item may be sold. A stores table contains a list of customers who currently subscribe to the DDS or who subscribed to it in the past. The store table contains contact information, addresses, URLs and any other pertinent information. It also includes flags that allow/disallow new products to be sold. Also included is a cart table has a digital basket identifier associated with it. As items are sold from the POS system, a record is created in this table (if one did not exist) and the associated content is inserted into a cart content table (discussed below). The cart table holds information that is transaction specific. Examples of information in cart table are store number, POS receipt number, date and time. A cart content table is also included. As digital content items are sold, they are added to this table. The cart content table holds all transaction information associated with the digital content items and therefore includes receipt number, transaction ID, etc., which is line item specific. A consumer table is utilized to store consumer information, including name, address, and any other demographic data. A consumer's email address is used as a key, and the table also holds a password. Columns of the consumer table can include: e-mail, password, first name, last name, date of birth (optional), gender (optional), graduation year (optional), level of study (optional). When a basket is associated with a specific consumer, the cart content information is moved into a separate consumer content table. The association of content with a specific user was described earlier in connection with FIG. 3C, which shows screen 330 from which items on a receipt can be transferred to a consumer's bookshelf. In should be noted that the above-described tables are only examples of entities that can be included in the digital delivery database 104 and therefore any other suitable entities can be included and/or the above tables can be modified. Example embodiments in which at least one of the above entities is modified are included below.

In one embodiment, users can create a unique account on each store site they may visit and/or combine accounts across stores. If a store ID field is added to the consumer table, the creation of different accounts for each store can easily be forced.

In one embodiment, the system provides the ability to sell quantities of a given digital content item. In such an embodiment, one consumer can purchase multiple copies of a digital content item and then download it to multiple computers. This is handled by having multiple quantity fields in the consumer content table. The consumer can download the digital content item up to the number of times that he/she purchased the item.

Some embodiments include modifications that correspond to special features provided by third party software. For example, the Adobe PDF reader makes special allowances for consumers that use a .NET passport when registering content. Thus, in one embodiment, this may be promoted on the digital delivery site and/or the .NET passport may be used on the digital delivery site.

Although the digital delivery system has been described with reference to preferred embodiments, workers skilled in the art will recognize that changes may be made in form and detail without departing from the spirit and scope of the disclosure.

What is claimed is:

1. A method comprising:
configuring a point-of-sale computer system in a brick and mortar store to carry out both sales of physical items that are a part of an inventory of the brick and mortar store and sales of digital content items, the sales of the digital content items being performed by a digital content handling system comprising:

a digital content web service accessed by the point-of-sale computer system to carry out the sale of the digital content items;
a digital delivery database configured to store information generated from the sales of the digital content items; and
a centralized digital delivery web application comprising:
a back office site comprising screens to carry out management functions in the digital content handling system, the management functions including entry of the digital content items into the digital content handling system; and
a digital delivery site configured to enable downloading of the digital content items after the digital content items are purchased,
wherein the back office site and the digital delivery site are configured to perform an extensible markup language (XML) to hypertext markup language (HTML) transformation of content;
providing a plurality of physical non-programmable reusable hangtags, wherein each of the plurality of physical non-programmable reusable hangtags includes both user-readable and machine-readable digital content identification information for a particular one of the digital content items, and wherein each of the plurality of physical non-programmable reusable hangtags has a hanging hole, and wherein each of the plurality of physical non-programmable reusable hangtags has no intrinsic value;
receiving, via an input of the point-of-sale computer system in the brick and mortar store, digital content identification information related to one of the plurality of digital content items, the digital content identification information being obtained from a physical non-programmable reusable hangtag, of the plurality of physical non-programmable reusable hangtags, for the one of the plurality of digital content items at the brick and mortar store;
obtaining payment for the digital content item from a customer at the brick and mortar store;
generating, using a processor of the point-of-sale computer system in the brick and mortar store, an anonymous physical receipt having a receipt number and a single access code that represents the digital content item;
providing the anonymous physical receipt having the receipt number and the single access code to the customer at the brick and mortar store; and
retaining the physical non-programmable reusable hangtag at the brick and mortar store for subsequent use for obtaining the digital content identification information for the digital content item,
wherein the digital content item is accessed, via a computer, other than the point-of-sale computer system, that is connected to a network that comprises software that is a part of the digital content handling system, and wherein the software comprises:
a first screen configured to receive user identification information, which comprises a username and a password, independently of the receipt number and the single access code;
a second screen accessed after the username and the password are received in the first screen, the second screen being configured to receive the receipt number and the single access code; and
instructions to deliver the digital content item in response to receiving the receipt number and the single access code in the second screen independently of any other codes, identification numbers or information related to the digital content item, wherein the receipt number and the single access code are obtained only from the anonymous physical receipt.

2. The method of claim 1 wherein digital content item is a digital book.

3. The method of claim 2 wherein obtaining the identification information related to the digital book from the physical non-programmable reusable hangtag comprises scanning bar-coded information related to the digital book from the physical non-programmable reusable hangtag.

4. The method of claim 1 wherein the digital content item comprises a plurality of digital content items and wherein the single access code represents the plurality of digital content items.

5. The method of claim 4 and wherein at least one of the plurality of digital content items is from a different digital content provider than at least another one of the plurality of digital content items.

6. The method of claim 1 and further comprising, in response to receiving the receipt number and the single access code electronically entered by the customer, displaying the digital content item in a non-consumer-specific domain.

7. The method of claim 6 and further comprising, in response to the customer selecting the displayed digital content item, transferring the digital content item from the non-consumer-specific domain to a consumer-specific non-anonymous domain.

8. The method of claim 7 and further comprising, in response to the customer selecting the digital content item for download in the consumer-specific non-anonymous domain, downloading the digital content item.

9. A system comprising:
a reusable hangtag including digital content identification information that identifies a digital content item, wherein the reusable hangtag comprises a hanging hole, and wherein the reusable hangtag has no intrinsic value;
an in-store point-of-sale computer system configured to carry out sales of physical items that are a part of an inventory of a brick and mortar store that includes the in-store point-of-sale computer system, and configured to carry out sales of digital content items, the in-store point-of-sale computer system comprising:
an input configured to:
receive identification information from the physical items; and
receive the digital content identification information related to the digital content item from the reusable hangtag; and
a processor configured to generate an anonymous receipt having a receipt number and a single access code that represents the digital content item;
a digital content handling system comprising:
a digital content web service accessed by the in-store point-of-sale computer to carry out the sale of the digital content items;
a digital delivery database configured to store information generated from the sales of the digital content items; and
a centralized digital delivery web application comprising:
a back office site comprising screens to carry out management functions in the digital content handling system, the management functions including entry of the digital content items into the digital content handling system; and a digital delivery site configured to enable downloading of the digital content item after the digital content item is purchased,
    wherein the back office site and digital delivery site are configured to perform an extensible markup language (XML) to hypertext markup language (HTML) transformation of content; and
a digital-content-sales-interface that links the in-store point-of-sale computer system and the digital content handling system;
wherein the in-store point-of-sale computer system is configured to carry out the sales of physical items independently of the digital content handling system and to carry out the sales of digital content items when linked to the digital content handling system, and
wherein the digital content item is accessed, via a computer, other than the in-store point-of-sale computer system, that is connected to a network that comprises software that is a part of the digital content handling system, and wherein the software comprises:
    a first screen that receives user identification information, which comprises a username and a password, independently of the receipt number and the single access code;
    a second screen accessed after the username and the password are received in the first screen, the second screen receives the receipt number and the single access code; and
    instructions to deliver the digital content item in response to receiving the receipt number and the single access code in the second screen independently of any other codes, identification numbers or information related to the digital content item, wherein the receipt number and the single access code are obtained only from the anonymous receipt.

10. The system of claim 9 and wherein the in-store point-of-sale computer system is configured to carry out the sales of physical items when the digital-content-sales-interface is disabled.

11. The system of claim 9 and further comprising a barcode scanner for obtaining bar-coded identification information related to the digital content item.

12. The system of claim 9 wherein the digital content item comprises a plurality of digital content items and wherein the single access code represents the plurality of digital content items.

13. The method of claim 1 and wherein the physical items comprise physical books, and wherein the digital content items comprise electronic copies of the physical books, and wherein configuring the point-of-sale computer system further comprises configuring a binding code feature, which enables the point-of-sale computer system to identify paperback copies, hardback copies and spiral copies of the physical books, to further enable the point-of-sale computer system to identify electronic copies of the physical books.

* * * * *